US009632609B2

(12) United States Patent
Tsukamoto et al.

(10) Patent No.: US 9,632,609 B2
(45) Date of Patent: Apr. 25, 2017

(54) SENSOR SHEET, SENSOR SHEET MODULE, TOUCH SENSOR PANEL MODULE, AND ELECTRONIC EQUIPMENT

(71) Applicant: SHARP KABUSHIKI KAISHA, Osaka-shi, Osaka (JP)

(72) Inventors: Hiroaki Tsukamoto, Osaka (JP); Nakae Nakamura, Osaka (JP); Satoru Kudose, Osaka (JP); Nobuaki Asayama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 10 days.

(21) Appl. No.: 14/785,052

(22) PCT Filed: Apr. 7, 2014

(86) PCT No.: PCT/JP2014/001994
§ 371 (c)(1),
(2) Date: Oct. 16, 2015

(87) PCT Pub. No.: WO2014/171102
PCT Pub. Date: Oct. 23, 2014

(65) Prior Publication Data
US 2016/0098111 A1    Apr. 7, 2016

(30) Foreign Application Priority Data
Apr. 18, 2013  (JP) ................. 2013-087489

(51) Int. Cl.
*G06F 3/041*  (2006.01)
*G06F 3/044*  (2006.01)

(52) U.S. Cl.
CPC ............. *G06F 3/041* (2013.01); *G06F 3/044* (2013.01); *G06F 3/0416* (2013.01); *G06F 2203/04103* (2013.01)

(58) Field of Classification Search
CPC .......... G06F 3/044; G06F 3/047; G06F 3/005; H04N 5/32
See application file for complete search history.

(56) References Cited

U.S. PATENT DOCUMENTS

| 2009/0273572 | A1 | 11/2009 | Edwards et al. |
| 2012/0089348 | A1* | 4/2012 | Perlin ............... G06F 3/005 702/41 |
| 2015/0139397 | A1* | 5/2015 | Smith ............... H04N 5/32 378/62 |

FOREIGN PATENT DOCUMENTS

| TW | 200944877 A1 | 11/2009 |
| TW | 201203062 A1 | 1/2012 |

OTHER PUBLICATIONS

International Search Report for PCT/JP2014/001994 mailed Jun. 24, 2014, two (2) pages.

* cited by examiner

*Primary Examiner* — Gerald Johnson
(74) *Attorney, Agent, or Firm* — Nixon & Vanderhye P.C.

(57) ABSTRACT

The efficiency of a product cycle is considerably enhanced by avoiding loss from designing to production including member loss matching various sizes of touch sensor panels. Unit sensor sheets having a square outer shape on which a multiple number of sense lines 21 as a multiple number of conductive wirings are arranged in parallel, are disposed in 3 row, 3 column. Each end of each of the multiple number of sense lines 21 as a multiple number of conductive wirings is sequentially matched one-to-one between unit sensor sheets, for example, between the sensor sheets 2A and 2B, or the sensor sheets 2B and 2C, and electrically connected with each other, and thereby the respective multiple number of sense lines 21 as a multiple number of conductive wirings (Continued)

are connected in a longitudinal direction thereof and are integrated, in the 3 row, 3 column of the unit sensor sheets 2A-2I.

8 Claims, 11 Drawing Sheets

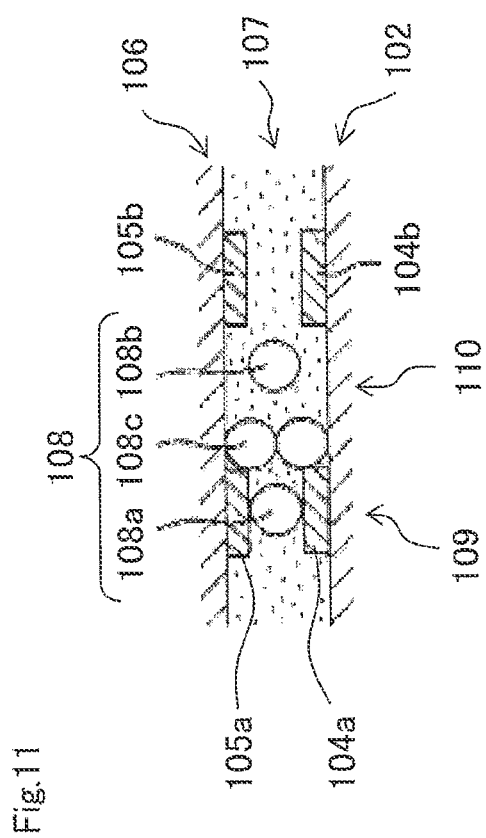

SENSOR SHEET, SENSOR SHEET MODULE, TOUCH SENSOR PANEL MODULE, AND ELECTRONIC EQUIPMENT

This application is the U.S. national phase of International Application No. PCT/JP2014/001994 filed 7 Apr. 2014 which designated the U.S. and claims priority to JP Patent Application No. 2013-087489 filed 18 Apr. 2013, the entire contents of each of which are hereby incorporated by reference.

TECHNICAL FIELD

The present invention relates to: a capacitive touch sensor panel module for driving drive lines formed on a substrate or film under a sensor sheet in which a multiple number of sense lines in a transverse direction are drawn to an electrode drawing section, and estimating or detecting a capacity value of capacitance between the sense lines and the drive lines that are orthogonal to each other to detect a touch position on a screen; a sensor sheet and a sensor sheet module used for this touch sensor panel module; and electronic equipment such as a PC (personal computer) or a tablet terminal using this touch sensor panel module.

BACKGROUND ART

Conventionally, a capacitive touch sensor panel that is installed in a display screen of a display device exists as a conventional position input device for detecting a position where a capacitance value is changed that is distributed in a matrix state. This touch sensor panel module is, for example, a conventional capacity detection device that detects distribution of capacitance values of capacitance rows and columns formed between M lines of drive lines and L lines of sense lines that are orthogonal to those drive lines.

In this conventional touch sensor panel module as a capacity detection device, when a touch sensor panel surface is touched by a finger or a pen, the capacitance value of the touched position changes, thereby allowing detection of a position where a capacity value is changed as an input position touched by a finger or pen.

FIG. 8 is a plan view schematically showing a configuration example of a conventional touch sensor panel module.

In FIG. 8, a conventional touch sensor panel module 120 has: a sensor sheet 123 provided with M lines of drive lines 121 in a longitudinal direction and L lines of sense lines 122 in a transverse direction that are provided on the downside of a glass substrate that is not shown; a FPC (flexible printed circuit) substrate 125 electrically connected to an electrode drawing section 124 of the sensor sheet 123; and a controller IC 126 as a touch sensor panel controller in which position information on the sensor sheet 123 is input from the FPC substrate 125 and capacity values of capacitance between the sense lines and the drive lines that are orthogonal to each other are estimated or detected and thereby a touch position on a screen is detected.

Further, the M lines of drive lines 121 in a longitudinal direction that are provided on the downside of a glass substrate not shown are also provided with an electrode drawing section 127, and a FPC substrate not shown is electrically connected to the electrode drawing section 127 to be electrically connected to a touch sensor panel controller not shown.

A case in which the conventional touch sensor panel module 120 is adapted to a large screen will be explained by using FIG. 9.

FIG. 9 is a plan view schematically showing a configuration example of a conventional touch sensor panel when the conventional touch sensor panel module of FIG. 8 is adapted to a large screen.

In FIG. 9, in a conventional touch sensor panel 130, four sensor sheets 123A-123D are disposed on a large screen without any space therebetween to form a square outer shape. Thereby, the four sensor sheets 123A-123D are able to cover an area that is four times larger than the sensor sheet 123 of FIG. 8. The multiple number of sense lines 122 in a transverse direction of the sensor sheet 123A are connected to a controller IC 126A via a FPC substrate 125A, and the multiple number of sense lines 122 in a transverse direction of the sensor sheet 123C are connected to the controller IC 126A via a FPC substrate 125C. Further, the multiple number of sense lines 122 in a transverse direction of the sensor sheet 123B are connected to a controller IC 126B via a FFC substrate 125B, and the multiple number of sense lines 122 in a transverse direction of the sensor sheet 123D are connected to the controller IC 126B via a FPC substrate 125D.

With respect to the controller IC 126A, L lines, which are 1 to Lth lines from the bottom, of the multiple number of sense lines 122 in a transverse direction of the sensor sheet 123A, are disposed sequentially in parallel; L lines, which are L+1 to 2Lth lines from the bottom, of the multiple number of sense lines 122 in a transverse direction of the sensor sheet 123C, are disposed sequentially in parallel; and 2L lines (transmission lines) of the multiple number of sense lines 122 of the sensor sheets 123A and 123C are positioned sequentially and consecutively from the bottom to the top. Further, similarly, with respect to the controller IC 126B, L lines, which are 1 to Lth lines from the bottom, of the multiple number of sense lines 122 in a transverse direction of the sensor sheet 123B, are disposed sequentially in parallel; L lines, which are L+1 to 2Lth lines from the bottom, of the multiple number of sense lines 122 in a transverse direction of the sensor sheet 123D, are disposed sequentially in parallel; and 2L lines (transmission lines) of the multiple number of sense lines 122 of the sensor sheets 123B and 123D are positioned sequentially and consecutively from the bottom to the top.

The conventional touch sensor panel 130 has: a FPC substrate 132A electrically connected to an electrode drawing section 131A of the multiple number of drive lines 121 formed on a substrate or film under the sensor sheet 123A; a FPC substrate 132B electrically connected to an electrode drawing section 131B of the multiple number of drive lines 121 formed on a substrate or film under the sensor sheet 123B; and a controller IC 133A as a touch sensor panel controller for sequentially applying a predetermined voltage to the multiple number of drive lines 121 via the FPC substrates 132A and 132B, respectively.

Further, although not shown in the Figure, the conventional touch sensor panel 130 has: a FPC substrate 132C (not shown) electrically connected to an electrode drawing section 131C of the multiple number of drive lines 121 formed on a substrate or film under the sensor sheet 123C; a FPC substrate 132D electrically connected to an electrode drawing section 131D of the multiple number of drive lines 121 formed on a substrate or film under the sensor sheet 123D; and a controller IC 133C (not shown) as a touch sensor panel controller for sequentially applying a predetermined voltage to the multiple number of drive lines 121 via the FPC substrates 132C and 132D, respectively.

With respect to the controller IC 133A, Ma lines, which are 1 to Mth lines from the left, of the multiple number of drive lines 121 formed on a substrate or film under the sensor sheet 123A, are sequentially disposed in parallel; M lines, which are M+1 to 2Mth lines from the left, of the multiple number of drive lines 121 formed on a substrate or film under the sensor sheet 123B, are sequentially disposed in parallel; and 1 to 2Mth lines of the multiple number of drive lines 121 are positioned sequentially and consecutively. Further, similarly, with respect to the controller IC 133C not shown, Ma lines, which are 1 to Mth lines from the left, of the multiple number of drive lines 121 formed on a substrate or film under the sensor sheet 123C, are disposed sequentially in parallel; M lines, which are M+1 to 2Mth lines from the left, of the multiple number of drive lines 121 formed on a substrate or film under the sensor sheet 123D, are disposed sequentially in parallel; and 1 to 2Mth lines of the drive lines 121 are disposed sequentially and consecutively.

Herein, there is a method of, in a conventional touch sensor panel, disposing an anisotropic conductive adhesive agent between a conductor pattern of a cable in a FPC substrate and a land pattern conductively connected to an electrode of a glass plate, and crimping the glass plate and the cable to each other to conductively connect the land pattern and the conductor pattern. Regarding this method, an explanation will be made below while referring to the drawings.

FIG. 10(a) is a schematic plan view of a conventional touch sensor panel disclosed in Patent Literature 1, and FIG. 10 (b) is an exploded perspective view showing a cable connection portion of a touch sensor panel 100 of FIG. 10(a).

As shown in FIG. 10 (a) and FIG. 10 (b), the conventional touch sensor panel 100 has a first substrate 102 and a flexible second substrate 103 that are fixed separately from each other in an opposing state by an adhesion means 101 such as a double-faced tape. The first substrate 102 is, for example, a glass plate having a conductive coating such as an indium tin oxide coating (hereinafter, referred to as ITO) and a pair of electrodes conductively connected to the conductive coating, and the second substrate 103 is, for example, a film having a conductive coating such as an ITO and a pair of electrodes conductively connected to the conductive coating. The glass plate 102 further has a land pattern 104 which is conductively connected to the electrodes of the glass plate 102 and film 103 and which is positioned at an end of the glass plate 102. The conventional touch sensor panel 100 further has a cable 106 comprising a conductor pattern 105 conductively connected to the land pattern 104 on the glass plate 102 in an overlapping manner.

The conductor pattern 105 of the cable 106 and the land pattern 104 of the glass plate 102 are adhered to each other by an anisotropic conductive adhesive agent 107. In further detail, by the anisotropic conductive adhesive agent 107, each of four electrode connecting sections 105a-105d as the conductor pattern 105 and each of four electrode drawing sections 104a-104d as the land pattern 104 are connected to each other. For example, the electrode connecting section 105a and the electrode drawing section 104a are matched and connected. Herein, each of the electrode connecting sections 105a-105d of the conductor pattern 105 has first cut off portions 119a-119d formed by partially cutting an interior portion of each of the electrode connecting sections 105a-105d. A preferable specific example of the first cut off portions 119a-119d is a slit such as that shown in FIG. 10(b). Further, the electrode drawing sections 104a-104d of the land pattern 104 also have second cut off portions (slits) formed by partially cutting an interior portion of each of the electrode drawing sections 104a-104d. In portions adjacent to the first cut off portions 119a-119d and the second cut off portions, that is, substantial conduction portions, the conductor pattern 105 of the cable 106 and the land pattern 104 of the glass plate 102 overlap each other. For example, in the specific examples that are shown, the slits of the electrode drawing sections 104a-104d extend in a reverse direction that is 180 degrees different from the slits of the electrode connecting sections 105a-105d.

Each of the electrodes connecting sections 105a-105d and each of the electrode drawing sections 104a-104d both have a slit or a strip shape, and since directions to which the two slits extend are different from each other, good conductive connection state can be obtained.

A crimping force for adhesion applied to the cable 106 and the glass plate 102 is not applied uniformly to all of a multiple number of conductive particles 108 included within the anisotropic conductive adhesive agent 107 between the two, as shown in FIG. 11. In further detail, a great crimping force is applied to the conductive particles 108a in the vicinity of a portion where portions adjacent to the slit portions of the electrode connecting section 105b of the conductor pattern 105 and portions adjacent to the slit portions of the electrode drawing section 104b of the land pattern 104 overlap each other, or in the vicinity of a substantial conduction portion 109, but a great crimping force is not applied to the conductive particles 108b in the vicinity of other portion 110. The area of this substantial conduction portion 109 is considerably small compared to a case in which slits only exist in either of the electrode connecting section 105b and the electrode drawing section 104b, or a case in which slits exist in neither of them. Thus, a crimping force applied to the conductive particles 108a in the vicinity of the substantial conduction portion 109 becomes significantly large. Accordingly, even if a total crimping force is smaller than a certain value to avoid damaging the cable 106 and the glass plate 102, the conductive particles 108a can strongly adhere with the electrode connecting section 105a and the electrode drawing section 104a in the substantial conduction portion 109, and good conductive connection state of the electrode connecting section 105a and the electrode drawing section 104a can be obtained. Good conductive connection state obtained in this manner is hardly impaired even after going through a high-temperature and high-humidity environmental test, and thus temporal stability is remarkable.

CITATION LIST

Patent Literature

Patent Literature 1: Japanese Laid-Open Publication No. 2005-141643

SUMMARY OF INVENTION

Technical Problem

The above-described conventional touch sensor panel is used on various display screens (displays) from small-sized type to large-sized type. Thus, with respect to a size of a touch sensor panel matching each screen size, it is necessary to deal with designing, manufacture and mass production of a touch sensor panel in each size. In particular, since the failure rate becomes extremely high in large-screen touch sensor panels due to manufacturing process, touch sensor panels in large size have difficulty in production. At the same time, there is also a waste of time and human investment from designing that matches to each size to production. In particular, regarding production cost, considerable loss was caused in materials, line efficiency (model switching) and facility investment (facility for matching each size) since production in accordance with each size is necessary.

In manufacture of the above-described conventional touch sensor panel, in order to manufacture touch sensor panels in various sizes, manufacturers were required to arrange designing, member arrangement, line switching, production apparatuses and the like matching each size, ranging from small-sized type to large-sized type, in particular, members and devices matching each size. In particular, when manufacturing/producing a large-sized touch sensor panel, the failure rate of a touch sensor panel itself becomes significantly high as the touch sensor panel grows in size, and there is also difficulty in cost. In addition, in a large-sized touch sensor panel, large loss was caused in every aspects from designing to production, and the efficiency of a product cycle was lowered.

In the above-described conventional capacitive touch sensor panel 130 which enables a multi-touch, adaptation to a large screen is realized by only arranging the four sensor sheets 123A-123D next to each other without any space therebetween, the controller ICs 126A-126D being connected to these sensor sheets via the FPC substrates 125A-125D, respectively.

The present invention solves the above-described conventional problem, and the objective thereof is to provide: a touch sensor panel module, which does not have loss from designing to production including member loss matching various sizes of touch sensor panels and can considerably enhance the efficiency of a product cycle; a sensor sheet and a sensor sheet module used for this touch sensor panel module; and electronic equipment such as a PC (personal computer) or a tablet terminal using this touch sensor panel module.

Solution to Problem

In a sensor sheet according to the present invention, unit sensor sheets having a square outer shape on which a multiple number of conductive wirings are arranged in parallel are disposed in n row or m column, or n row, m column (n, m are natural numbers of 2 or higher), and wherein each end of each of the multiple number of conductive wirings are sequentially matched one-to-one between the unit sensor sheets and electrically connected, and wherein the respective multiple number of conductive wirings are connected in a longitudinal direction thereof and are integrated in the n row or m column, or n row, m column of the unit sensor sheets, thereby achieving the above-described objective.

Further, preferably, ends of the multiple number of conductive wirings between the unit sensor sheets in the sensor sheet of the present invention are matched one-to-one, an anisotropic conductive paste or an anisotropic conductive film using nanoparticles is interposed between the ends, and the ends are electrically connected with each other by thermocompression bonding with a predetermined temperature and a predetermined pressure.

In a sensor sheet module according to the present invention, for each of the unit sensor sheets on either of the both ends of the multiple number of conductive wirings connected in a longitudinal direction, of the above-described sensor sheet of the present invention, electrode drawing sections connected to each of the multiple number of conductive wirings are arranged, and for each of the electrode drawing sections, a controller means is electrically connected to the electrode drawing sections via a flexible circuit substrate, thereby achieving the above-described objective.

In a touch sensor panel module according to the present invention, for each of the unit drive sheets matching the unit sensor sheets, on either of the both ends of the multiple number of conductive wirings formed on a substrate or drive sheet under the sensor sheet of the above-described sensor sheet module of the present invention, electrode drawing sections connected to each of the multiple number of conductive wirings are arranged, and for each of the electrode drawing sections, the controller means is electrically connected to the electrode drawing sections via a flexible circuit substrate, thereby achieving the above-described objective.

Further, preferably, in a drive sheet in a touch sensor panel module according to the present invention, unit drive sheets having a square outer shape on which a multiple number of conductive wirings are arranged in parallel are disposed in n row, m column (n, m are natural numbers of 2 or higher), and each end of each of the multiple number of conductive wirings are sequentially matched one-to-one between the unit drive sheets and electrically connected, and the multiple number of conductive wirings are connected in a longitudinal direction thereof, respectively, to be integrated in the n row, m column of the unit drive sheets, thereby achieving the above-described objective.

Further, preferably, ends of the multiple number of conductive wirings between the unit drive sheets in a touch sensor panel module according to the present invention are matched one-to-one, an anisotropic conductive paste or an anisotropic conductive film using nanoparticles is interposed between the ends, and the ends are electrically connected with each other by thermocompression bonding with a predetermined temperature and a predetermined pressure.

Furthermore, preferably, a controller means of a touch sensor panel module of the present invention drives a plurality of drive lines of a touch sensor panel, and estimates or detects the capacity value after amplifying a capacity value of capacitance between the above-described sense lines and the above-described drive lines by an amplifier to detect a touch position on a screen.

In an electronic equipment according to the present invention, the above-described touch sensor panel module of the present invention is used on a display screen as a position input device, thereby achieving the above-described objective.

By the above-described configuration, the action of the present invention will be explained below.

In the present invention, unit sensor sheets having a square outer shape on which a multiple number of conductive wirings are arranged in parallel are disposed in n row or m column, or n row, m column (n, m are natural numbers of 2 or higher), and each end of each of the multiple number of conductive wirings are sequentially matched one-to-one between the unit sensor sheets and electrically connected, and the multiple number of conductive wirings are connected in a longitudinal direction thereof, respectively, to be integrated in the n row or m column, or n row, m column of the unit sensor sheets.

Thereby, it is possible to avoid loss from designing to production including member loss matching various sizes of touch sensor panels, thereby considerably enhancing the efficiency of a product cycle.

Advantageous Effects of Invention

According to the present invention as described above, it is possible to: omit effort for designing that matches touch sensor panels in various sizes; eliminate switching of production lines matching touch sensor modules in various sizes; and perform production that is adaptable to medium and large types by using a production device of a sensor sheet module of small and medium-sized types.

In addition, product development cycle time can be considerably shortened, and as a result, large loss can be curtailed in every aspects from designing to production including member loss, thereby allowing considerable enhancement in a product cycle.

BRIEF DESCRIPTION OF THE DRAWINGS

FIG. 11 is a major part vertical cross-sectional view for explaining a case in which a conductor pattern of a cable and a land pattern of a glass plate in the conventional touch sensor panel of FIG. 10 are electrically connected by an anisotropic conductive adhesive agent.

Figure 1:
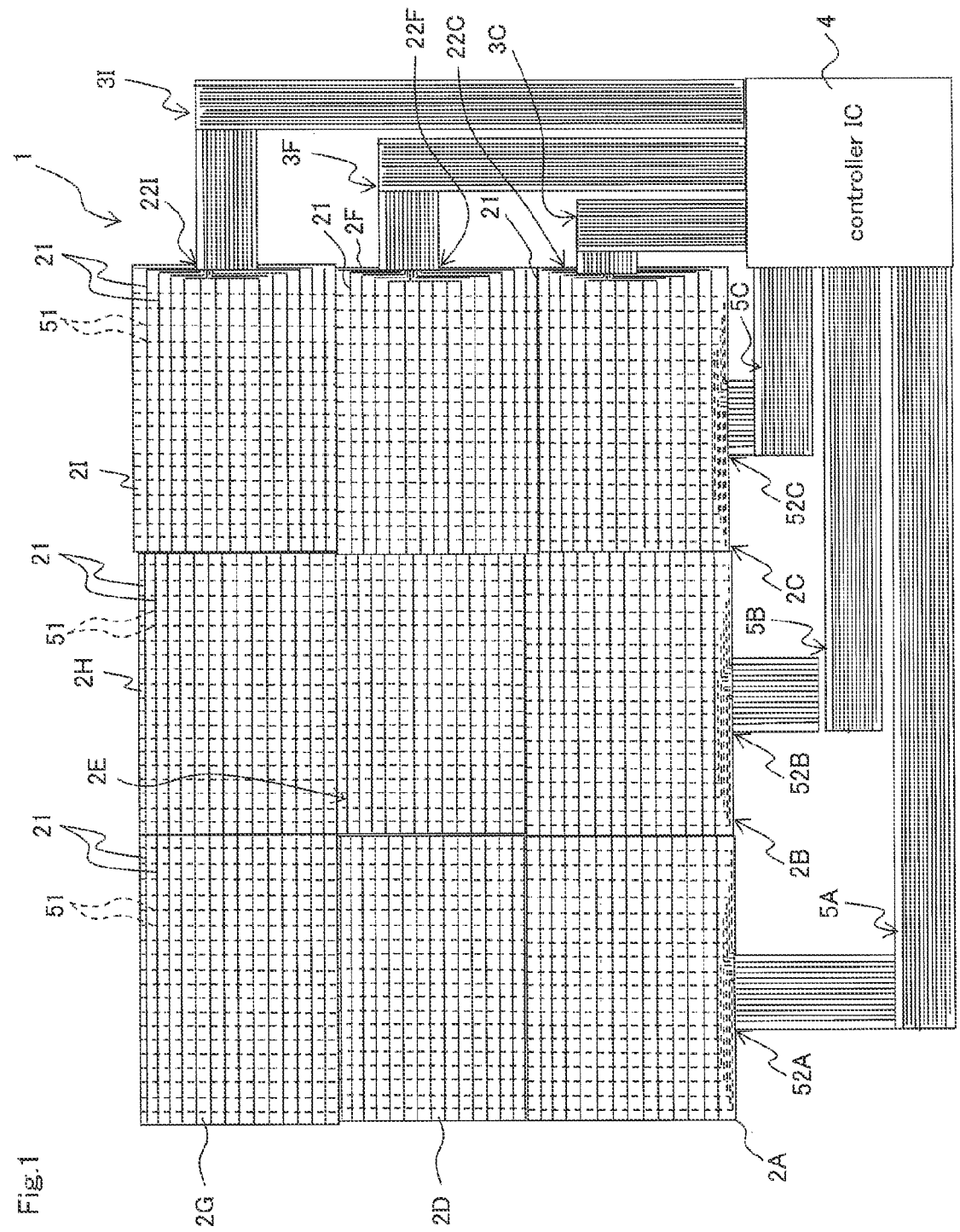
FIG. 1 is a plan view showing a major part configuration example of a touch sensor panel in Embodiment 1 of the present invention.

REFERENCE NUMERAL LIST 1 touch sensor panel module
2, 2A-2I sensor sheet (unit sensor sheet)
21, 21A-21C sense line
21B1, 21C1 end (end surface)
22, 22C, 22F, 22I, 52, 52A-52C electrode drawing section
25 spheroid
26 anisotropic conductive film
3, 3C, 3F, 3I, 5A-5C FPC substrate
4 controller IC (controller means)
51 drive line
6, 7 alignment mark

DESCRIPTION OF EMBODIMENTS

Hereinafter, Embodiment 1 of a touch sensor panel module according to the present invention and an electronic equipment such as a display device using the same will be explained in detail while referring to the drawings. In addition, from the standpoint of creating the Figures, the size, width, length, number, and the like of each constituent member in each Figure is not limited to the illustrated configuration. Further, from the standpoint of creating the Figures, sense lines 21 and drive lines 51 in which each end should be connected, and ends of the sense lines 21 or the drive lines 51 and ends of electrode drawing sections are expressed in a somewhat misaligned or separated manner in some portions. However, between the multiple number of sense lines 21, between the multiple number of drive lines 51, and between the multiple number of sense lines 21 or the multiple number of drive lines 51 and the electrode drawing sections, ends to be connected are matched one-to-one in left to right or top to bottom and electrically connected.

Embodiment 1

FIG. 1 is a plan view showing a major part configuration example of a touch sensor panel in Embodiment 1 of the present invention.

In FIG. 1, in a touch sensor panel module 1 of Embodiment 1, 9 sheets (3 row, 3 column) of sensor sheets 2A-2I are disposed on a large display screen without any space therebetween to form a square outer shape. Thereby, the 9 sheets of sensor sheets 2A-2I are able to cover an area that is 9 times larger than the sensor sheet 2A. An electrode drawing section 22C of the multiple number of sense lines 21 in a transverse direction of the sensor sheet 2C is connected to a controller IC 4 via a FPC substrate 3C; an electrode drawing section 22F of the multiple number of sense lines 21 in a transverse direction of the sensor sheet 2F are connected to a controller IC 4 via a FPC substrate 3F; and an electrode drawing section 22I of the multiple number of sense lines 21 in a transverse direction of the sensor sheet 21 is connected to a controller IC 4 via a FPC substrate 3I. Each of the sense lines 21 has a width of several μm (for example, 2 μm-20 μm; in this Embodiment, several μm), and the material thereof is composed of copper, aluminum, silver, gold, ITO or the like.

L lines, which are 1 to Lth lines from the bottom, of the multiple number of sense lines 21 in a transverse direction of the sensor sheet 2C, are disposed sequentially in parallel; L lines, which are L+1 to 2Lth lines from the bottom, of the multiple number of sense lines 21 in a transverse direction of the sensor sheet 2F, are disposed sequentially in parallel; and L lines, which are 2L+1 to 3Lth lines from the bottom, of the multiple number of sense lines 21 of the sensor sheet 21, are disposed sequentially in parallel, and position information from the sequential and consecutive sense lines 21 in a total of 3L lines is input into the controller IC 4.

Similarly, among the sequential and consecutive sense lines 21 in a total of 3L lines of the sensor sheets 2C, 2F and 2I; the sequential and consecutive sense lines 21 in a total of 3L lines of the sensor sheets 2B, 22E and 2H on the left side thereof; and the sequential and consecutive sense lines 21 in a total of 3L lines of the sensor sheets 2A, 22D and 2G on the further left side thereof; the end of each of the multiple number of sense lines 21 in a transverse direction is sequentially matched one-to-one and electrically connected with each other to be integrated as 3L lines of the sense lines 21, each line being in a transverse direction, in the sensor sheets 2A-2I.

Next, the touch sensor panel module 1 of Embodiment 1 has: a FPC substrate 5A electrically connected to an electrode drawing section 52A connected to each of the multiple number of drive lines 51 formed on a drive sheet (film) under the sensor sheet 2A; a FPC substrate 5B electrically connected to an electrode drawing section 52B of the multiple number of drive lines 51 formed on a drive sheet (film) under the sensor sheet 2B; a FPC substrate 5C electrically connected to an electrode drawing section 52C of the multiple number of drive lines 51 formed on a drive sheet (film) under the sensor sheet 2C; and a controller IC 4 as a touch sensor panel controller for sequentially applying a predetermined voltage to the multiple number of drive lines 51 via the FPC substrates 5A-5C, respectively. Each of the drive lines 51 has a width of several μm, and the material thereof is composed of copper, aluminum, silver, gold, ITO or the like.

M lines, which are 1 to Mth lines from the left, of the multiple number of drive lines 51 formed on a drive sheet (film) under the sensor sheet 2A, are sequentially disposed in parallel; M lines, which are M+1 to 2Mth lines from the left, of the multiple number of drive lines 51 formed on a drive sheet (film) under the sensor sheet 2B, are sequentially disposed in parallel; and M lines, which are 2M+1 to 3Mth lines from the left, of the multiple number of drive lines 51 formed on a drive sheet (film) under the sensor sheet 2C, are sequentially disposed in parallel. The drive lines 51 in a total of 3M lines are sequentially disposed in parallel in a longitudinal direction, and a predetermined voltage is sequentially applied to the sequential and consecutive drive lines 51 in a total of 3M lines from the controller IC 4.

Similarly, among the drive lines 51 in a total of 3M lines formed on drive sheets (films) under the sensor sheets 2A-2C; the drive lines 51 in a total of 3M lines formed on drive sheets (films) under the sensor sheets 2D-2F on the upper side thereof; and the drive lines 51 in a total of 3M lines formed on drive sheets (films) under the sensor sheets 2G-2I on the further upper side thereof, the end of each of the drive lines 51 in each of 3M lines in a longitudinal direction are sequentially matched one-to-one and electrically connected with each other to be integrated as the drive lines 51 in total of 3M lines, each line being in a longitudinal direction, in drive sheets (films) of the sensor sheets 2A-2I.

In this manner, the multiple number of sense lines 21 in a transverse direction are connected with each other, while being matched one-to-one to the adjacent sense lines 21 on left and right to which ends should be connected with each other, as well as the multiple number of drive lines 51 are also connected with each other, while being matched one-to-one to the adjacent drive lines 51 in above and below to which ends should be connected with each other.

Further, instead of the multiple number of drive lines 51 on the drive sheet under the sensor sheet 2, the multiple number of drive lines 51 may be provided directly on a glass substrate that is a large screen. Further, it is also possible to consecutively provide the multiple number of drive lines 51 in parallel on a drive sheet having a wide area adapted to a large screen. In these cases, the multiple number of drive lines 51 are not required to be electrically connected with each other, while being matched one-to-one to the adjacent drive lines 51 in above and below to which ends should be connected with each other as described above, and the multiple number of sense lines 21 in a transverse direction can be connected with each other, while being matched one-to-one to the adjacent sense lines 21 on left and right to which ends should be connected with each other.

A characteristic configuration of Embodiment 1 is a touch sensor panel, wherein: when manufacturing a medium-sized or large-sized touch sensor panel, a small or medium standard-sized touch sensor panel having a smaller area than a medium-sized or large-sized touch sensor panel is manufactured; and a multiple number, for example, 4, 9 or 16 (in Embodiment 1, 9 panels as in FIG. 1) of this small or medium standard-sized touch sensor panel are combined, and thereby a medium-sized or large-sized touch sensor panel is manufactured such that the outer shape in a planar view becomes a square shape.

Figure 9:
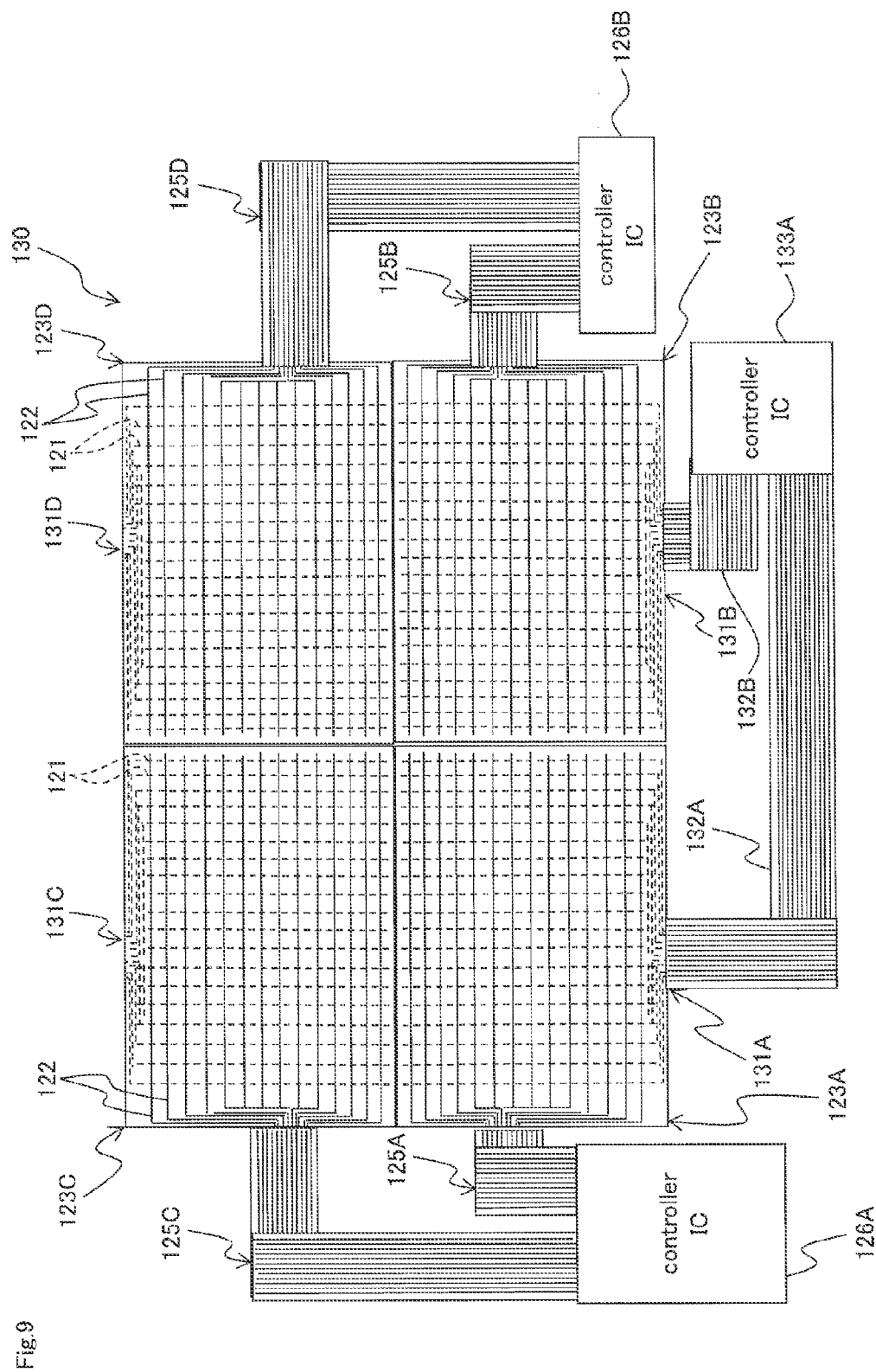
FIG. 9 is a plan view schematically showing a configuration example of a conventional touch sensor panel when the conventional sensor sheet module of FIG. 8 is applied to a large screen.
Figure 10:
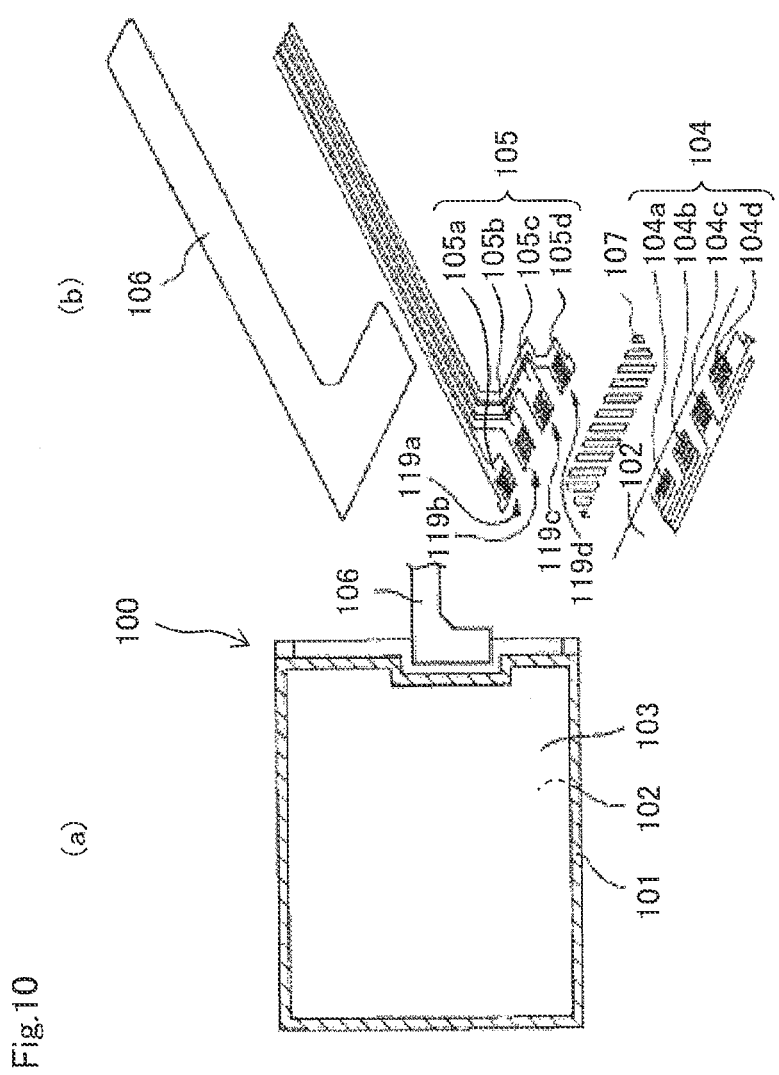
FIG. 10(a) is a schematic plan view of a conventional touch sensor panel disclosed in Patent Literature 1.
FIG. 10(b) is an exploded perspective view showing a cable connection portion of the touch sensor panel of FIG. 10(a).

Conventionally, there was a method of simply arranging a plurality of (four) touch sensor panels as in the aforementioned FIG. 9 to manufacture one touch sensor panel having a larger screen than the touch sensor panel. However, in this conventional method, a plurality of completed touch sensor panel modules are set as a unit, each of the touch sensor panel modules being independently equipped with a FPC substrate and a controller IC, and the controller IC is independently operated. In addition, the plurality of touch sensor panel modules are controlled by separate controller ICs such that the touch sensor panel in large size is controlled. As a result, in a large-sized touch sensor panel unit, a controller IC was required for each unit of touch sensor panel module, and the size of the outer shape becomes considerably larger than a single-sheet large panel. Further, this also caused an increase in cost.

In contrast, in Embodiment 1, a sensor sheet that is a chief material of a touch sensor panel is combined and adhered in a multiple number such that a planar outer shape becomes a square shape to manufacture a touch sensor panel of a desired size. In that panel, ends of the multiple number of sense lines 21, which are wirings in each standard-sized sensor sheet, are connected with each other. The multiple number of sense lines 21, which are the wirings between each sensor sheet, are matched one-to-one, and the ends are overlapped with each other, and an anisotropic conductive paste (ACP) or an anisotropic film (ACF) using a nanoparticle or the like is interposed therebetween to electrically connect the ends with each other by a thermal pressure (thermocompression bonding) with a predetermined temperature of 100-250 degrees Celsius and a predetermined pressure of 100 g-1000 g/mm$^2$. The nanoparticle is a metal surface spheroid where Ni plating is performed on a surface of a fine metal sphere or a fine plastic sphere of submicron order (sphere diameter of 10 nm-100 nm) and gold plating is performed thereon, and a multiple number of these spheroids are mixed within a thermoplastic material or a paste. The anisotropic conductive film (ACF) is used in a band form with a predetermined thickness. The thickness of each of the sense lines 21 is about 1 μm. The anisotropic conductive paste (ACP) using the nanoparticle may be disposed in each tip of the multiple number of sense lines 21 by printing.

Figure 2:
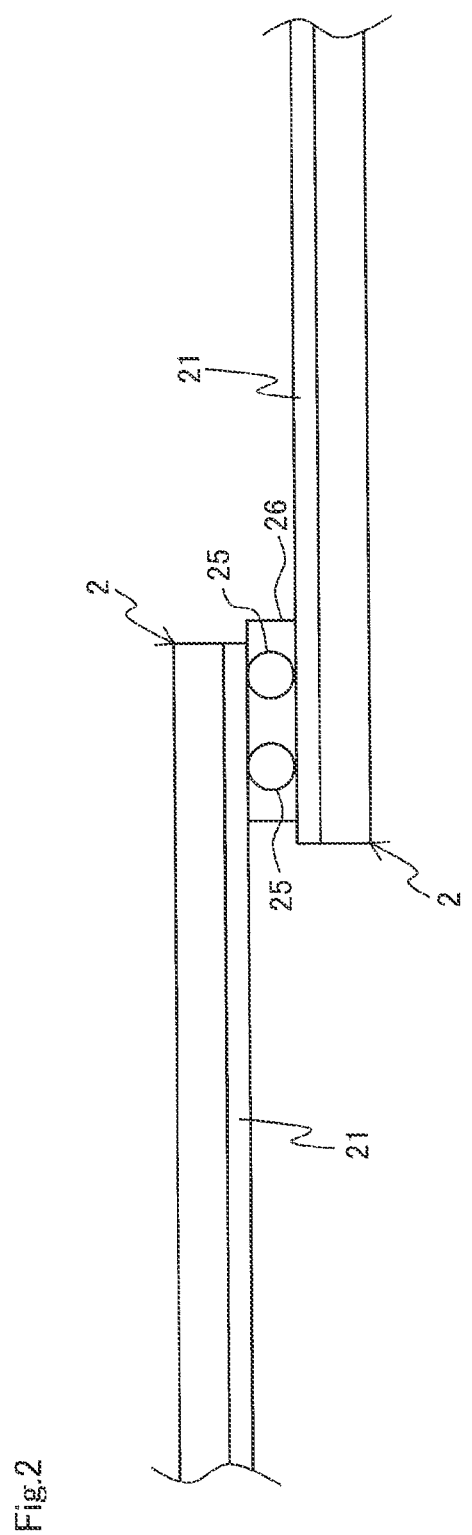
FIG. 2 is a cross-sectional view for explaining an electrical connection between ends of a multiple number of sense lines on two sensor sheets.

For example, as shown in FIG. 2, an anisotropic conductive film 26 comprising spheroids 25 with a gold plating surface such as nanoparticles is disposed in a strip shape such that it goes across above the ends of the multiple number of sense lines 21 on the sensor sheet 2. From the above of the anisotropic conductive film 26, each end of the multiple number of sense lines 21 on another sensor sheet 2 is set to the underside, and is overlapped on each end of the multiple number of sense lines 21 on the sensor sheet 2. The multiple number of sense lines 21 on the sensor sheet 2 on the lower side and the multiple number of sense lines 21 of the sensor sheet 2 on the upper side are matched one-to-one, and are electrically connected by the above-described thermal pressure by the spheroids 25 with a gold plating surface within the anisotropic conductive film 26 interposed therebetween. In this case, electrical connection is selectively made by the spheroids 25 only between the multiple number of sense lines 21 on the lower side and the multiple number of sense lines 21 on the upper side that are matched one-to-one.

In this manner, by a thermal pressure on the anisotropic conductive film 26, the multiple number of sense lines 21 in a transverse direction are connected with each other while being matched one-to-one to the adjacent sense lines 21 on left and right to which the ends should be connected. Further, similarly, if necessary, by a thermal pressure on the anisotropic conductive film 26, the multiple number of drive lines 51 that are orthogonal to the sense lines 21 are also connected with each other, while being matched one-to-one to the adjacent drive lines 51 in above and below to which the ends should be connected. Furthermore, similarly, an electrode drawing section of the multiple number of sense lines 21 in a transverse direction and an electrode connecting section as a conductor pattern of a FPC substrate are also electrically connected by a thermal pressure on the anisotropic conductive film 26, as well as an electrode drawing section of the multiple number of drive lines 51 in a longitudinal direction and an electrode connecting section as a conductor pattern of a FPC substrate are also electrically connected by a thermal pressure on the anisotropic conductive film 26.

Figure 3:
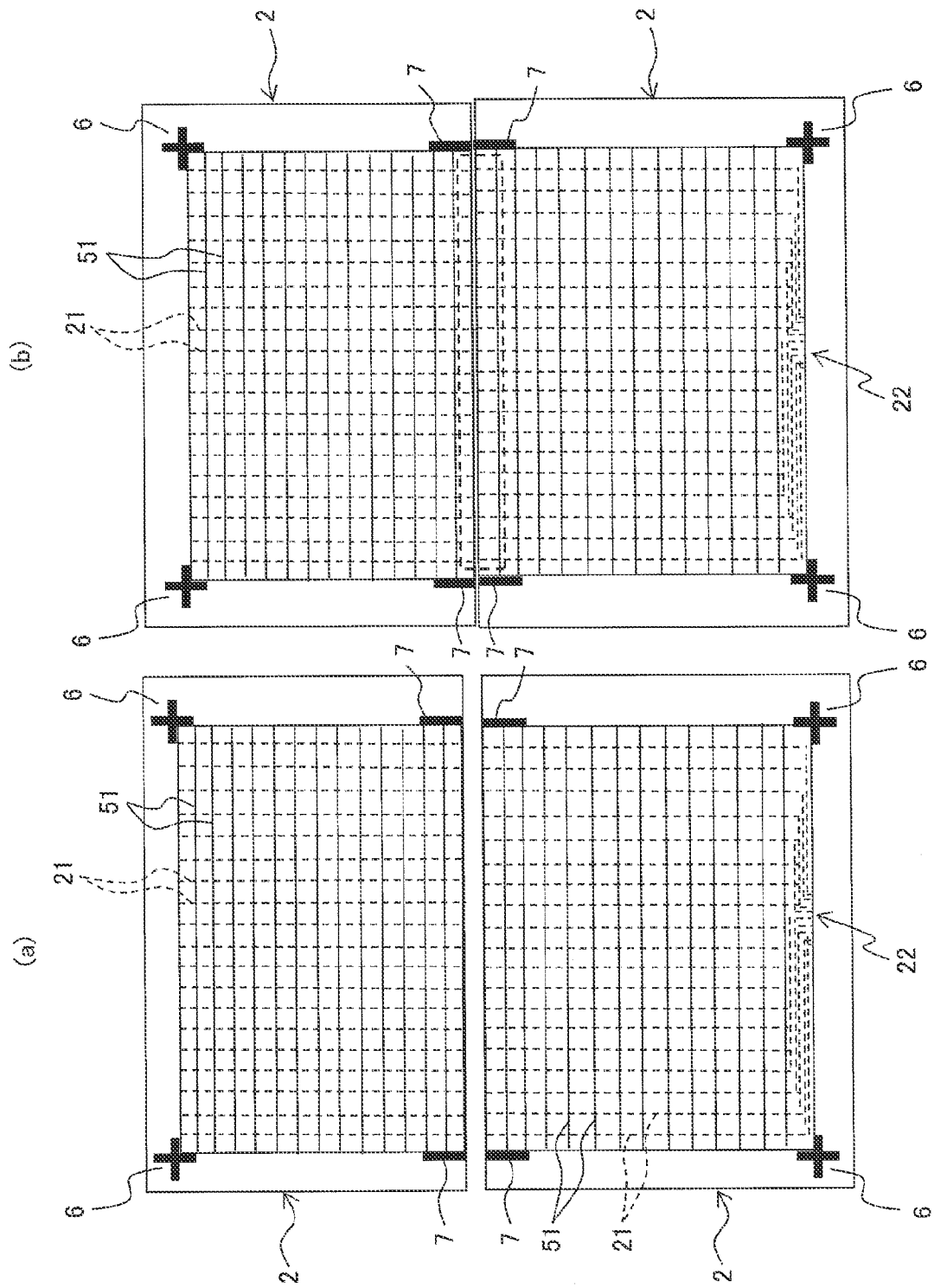
FIG. 3(a) is a plan view showing a state before adhering two sensor sheets on the upper side and the lower side.
FIG. 3(b) is a plan view showing a state after adhering the two sensor sheets on the upper side and the lower side.

FIG. 3(a) is a plan view showing a state before adhering two sensor sheets 2 on the upper side and the lower side, and FIG. 3(b) is a plan view showing a state after adhering the two sensor sheets 2 on the upper side and the lower side. In this Figure, the sense lines 21 in a longitudinal direction are shown in broken lines, and the drive lines 51 in a transverse direction are shown in solid lines.

Firstly, as shown in FIG. 3(a), by using two alignment marks 6 in a cross shape, positioning of the two sensor sheets 2 on the upper side and the lower side is performed, and the two sensor sheets 2 on the upper side and the lower side are disposed at predetermined positions.

Next, as shown in FIG. 3(b), the two sensor sheets 2 are moved such that each alignment mark 7 of the two sensor sheets 2 matches a predetermined position, and the anisotropic conductive film 26 is inserted therebetween and each end of the multiple number of sense lines 21 of the two sensor sheets 2 are overlapped such that the sense lines 21 match each other one-to-one.

Then, from the above of the ends of the multiple number of sense lines 21 that are overlapped, predetermined pressure and temperature are applied and thereby ends of the multiple number of sense lines 21 are electrically connected with each other such that they match each other one-to-one.

At this time, an overlapping distance is fixed, and in a direction orthogonal to the overlapping direction, image processing is performed by input of an image signal from a camera, and thereby fine adjustments are performed such that ends of the sense lines 21 centrally positioned among the multiple number of sense lines 21 are maximally overlapped to allow an overall efficient overlapping.

Thereby, in the two sensor sheets 2 in the state of the sensor sheet 2, a plurality of sensor sheets 2 are adhered to allow manufacture of a sensor sheet in a desired size, the multiple number of sense lines 21 of the sensor sheets 2 being all electrically connected in a one-to-one matched state.

Thus, product characteristics will not be satisfied unless wirings (sense lines 21) in each sensor sheet are connected by one-to-one matching in accordance with circuits. As the connection method, ends of the multiple number of sense lines 21 as wirings on each sensor sheet are electrically connected with each other, while being matched one-to-one by the anisotropic conductive film 26 or an anisotropic conductive film sheet.

It is necessary to match the sensor sheets 2 and match the multiple number of sense lines 21, which are wirings in the sensor sheets 2, by one-to-one. Therefore, the alignment marks 6 and 7 as positioning marks are provided for each of the sensor sheets 2. When adhering each of the sensor sheets 2, by using the alignment mark 6 as a positioning mark, positioning of the two sensor sheets 2 can be performed with high accuracy, by using the alignment mark 7, the two sensor sheets 2 can be overlapped by a predetermined amount with high accuracy, by performing image processing on an image captured by a camera, fine adjustments can be performed such that the ends of the multiple number of sense lines 21 overlap with each other most efficiently, and the two sensor sheets 2 can be adhered while inserting the anisotropic conductive film 26 therebetween.

Figure 4:
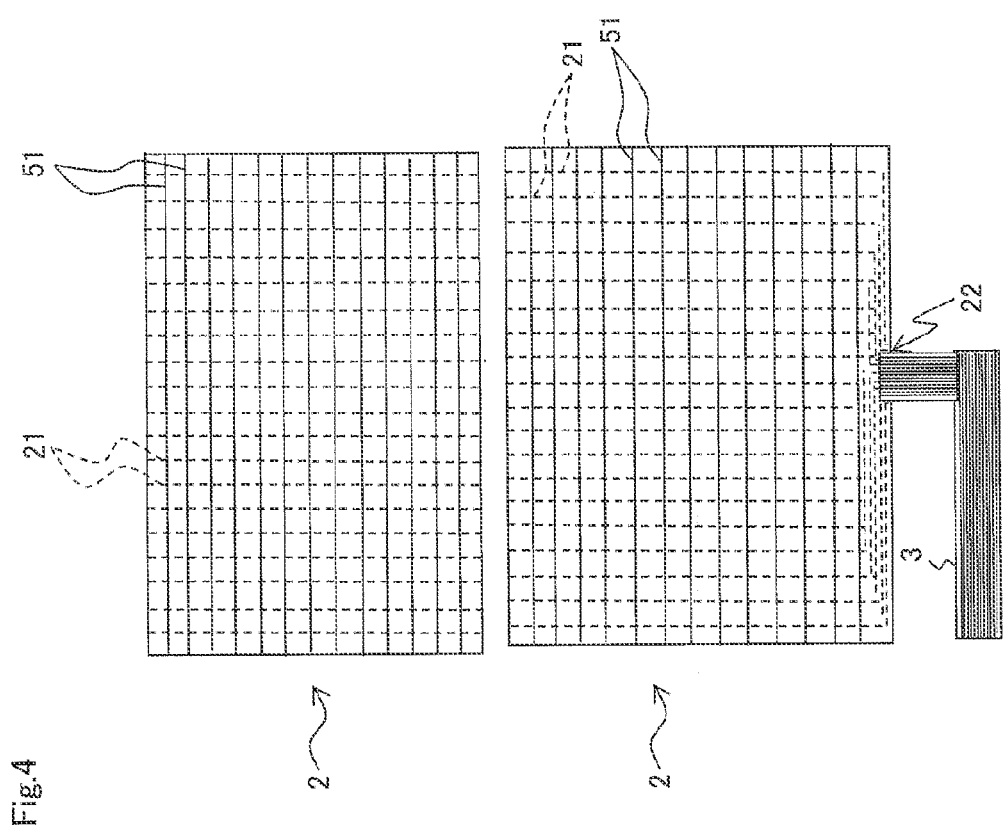
FIG. 4 is a plan view showing a state in which a FPC substrate is electrically connected to the lower side of the two sensor sheets.

FIG. 4 is a plan view showing a state in which a FPC substrate 3 is electrically connected to the lower side of the two sensor sheets 2.

In FIG. 4, the anisotropic conductive film 26 is provided between an electrode drawing section 22 of the multiple number of sense lines 21 in a longitudinal direction of the sensor sheet 2 on the lower side and an electrode connecting section as a conductor pattern of the FPC substrate 3. A predetermined thermal pressure is applied on a region of the multiple number of sense lines 21 in which the anisotropic conductive film 26 is interposed therebetween, to adhere the two sensor sheets 2 on the upper side and the lower side by the anisotropic conductive film 26, and thereby ends of the multiple number of sense lines 21 are overlapped with each other to be selectively connected.

Figure 5:
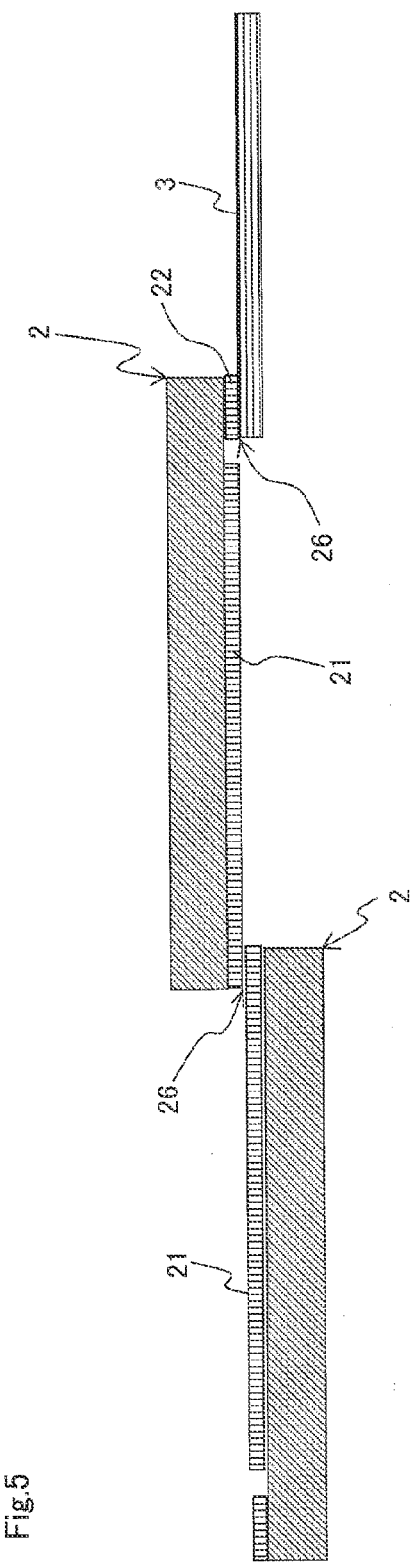
FIG. 5 is a vertical cross-sectional view for explaining a state in which the two sensor sheets and the FPC substrate are adhered.

FIG. 5 is a vertical cross-sectional view for explaining a state in which the two sensor sheets 2 and the FPC substrate 3 are adhered.

In Embodiment 1, top surfaces or back surfaces of the two sensor sheets 2 are adhered to each other, wherein the top surfaces or back surfaces are the same surfaces seen from the above. In this case, the multiple number of sense lines 21 used for connection are formed at a tip portion on the back surface side via throughholes at an end surface or near an end surface of the two sensor sheets 2. In FIG. 5, a combination of the top surface side of the sensor sheet 2 and the back surface side of the sensor sheet 2 seen from the above (in planar view) is shown as other adhering method of the sensor sheets 2 of a plurality of touch sensor panels.

While interposing the anisotropic conductive film 26, each end of the sense lines 21 are overlapped with each other by overlapping each end of the multiple number of sense lines 21 on the sensor sheet 2, which are set to the downside, on each end of the multiple number of sense lines 21 on the sensor sheet 2, and thereby ends of the multiple number of sense lines 21 on the sensor sheet 2 on the lower side and ends of the multiple number of sense lines 21 on the sensor sheet 2 on the upper side are electrically connected with each other while matching each of the sense lines 21 one-to-one per sense line 21.

Herein, in order to explain the effect of the touch sensor panel module 1 of Embodiment 1, the aforementioned conventional technique of FIG. 9 is further explained for comparison.

A conventional medium-sized or large-sized touch sensor panel module is mainly constituted of a sensor sheet, a controller IC and the FPC substrate 3, and a sensor sheet that matches with each size of touch sensor panel is constituted as a set of a touch sensor panel module. As a result, when a defect (such as an open or a short) is caused to a part of the multiple number of sense lines 21 of a sensor sheet, the sensor sheet naturally becomes defective, and it cannot be used. In a large-sized sensor sheet, probability of causing a sheet defect becomes considerably higher since an area of a sensor sheet becomes wider. As a method of enhancing non-defective rate in conventional large-sized sensor sheets for solving these problems, aforementioned FIG. 9 shows a method of forming a touch sensor panel module, wherein a set of medium-sized or large-sized sensor sheet module is formed by combining a plurality of small-sized or medium-sized sensor sheets. In manufacturing a medium-sized or large-sized touch sensor panel module in a plurality of sheets, each controller IC for controlling each small-sized or medium-sized sensor sheet is required for a plurality of small-sized or medium-sized touch sensor panel modules. Further, a controller IC for controlling the entire controller ICs is also required since there are a plurality of controller ICs for control. As a result, the product size of a touch sensor panel module becomes larger, and the production cost of the product itself also becomes higher. The biggest problem is that since spaces at the boundary of each small-sized or medium-sized touch sensor panel module are not constant pitch, there is a problem of disturbing a part of an image, creating a gap, or generating a difference in intensity.

In contrast, in the touch sensor panel module 1 of Embodiment 1, a medium-sized or large-sized touch sensor panel module is not manufactured by constituting the sensor sheets 2, the FPC substrate 3 and the controller IC 4 of a small-sized or medium-sized touch sensor panel module in a plurality of sets as the conventional technique, but a plurality of small-sized or medium-sized sensor sheets are combined and arranged in the state of a small-sized or medium-sized sensor sheet. Thereby, it is possible to considerably enhance the efficiency of a product cycle by avoiding loss from designing to production including member loss matching various sizes of touch sensor panels.

As a configuration of manufacturing a medium-sized or large-sized touch sensor panel module by combining a plurality of sheets of the small-sized or medium-sized sensor sheet 2 and electrically connecting ends of the multiple number of sense lines 21, which are the wirings of each touch sensor panel, there is a configuration of adhering a plurality of sheets of each sensor sheet 2, wherein two sensor sheets 2 are adhered in the state of the sensor sheet 2, and overlapping the top surface sides and back surface sides of each sensor sheet 2 to manufacture the sensor sheet 2 in a desired wide size.

According to Embodiment 1 as described above, it is possible to: omit effort for designing that matches touch sensor panels in various sizes; eliminate switching of production lines matching each sensor module; and perform production that is adaptable to medium-sized or large-sized sensor sheet modules by using a production device of small-sized or medium-sized sensor sheet modules. In addition, product development cycle time can be considerably shortened, and as a result, loss can be considerably curtailed in every aspects from designing to production, thereby allowing enhancement in a product cycle.

Further, Embodiment 1 is an embodiment for explaining the touch sensor panel module 1, wherein 9 sheets (3 row, 3 column) of the sensor sheets 2A-2I are disposed on a large display screen without any space therebetween to form a square outer shape. However, not being limited to this, in a touch sensor panel, 2 or 4 sheets (2 row or 2 column; or 2 row, 2 column) of the sensor sheets 2B, 2C, 2E and 2F may be disposed on a large display screen without any space therebetween to form a square outer shape, or 7 sheets of sensor sheets may be disposed such that they surround the left side and the upper side of the sensor sheets 2A-2I such that sensor sheets in a total of 16 sheets (4 row, 4 column) are disposed on a large display screen without any space therebetween to form a square outer shape. In short, in a touch sensor panel, a plurality of sensor sheets may be disposed on a large display screen without any space therebetween to form a square outer shape matching a large screen.

In short, in a sensor sheet according to the present invention, unit sensor sheets having a square outer shape on which the multiple number of sense lines 21 are arranged in parallel as a multiple number of conductive wirings are disposed in n row or m column, or n row, m column (n, m are natural numbers of 2 or higher). Each end of each of the multiple number of sense lines 21 as a multiple number of conductive wirings is sequentially matched one-to-one between unit sensor sheets, for example, between the sensor sheets 2A and 2B, or the sensor sheets 2B and 2C, and electrically connected with each other, and the respective multiple number of sense lines 21 as a multiple number of conductive wirings are connected in a longitudinal direction thereof and are integrated in the n row, m column of the unit sensor sheets.

Accordingly, in a sensor sheet module according to the present invention, for each of the unit sensor sheets on either of the both ends of the multiple number of sense lines 21 as a multiple number of conductive wirings connected in a longitudinal direction, of the above-described sensor sheet, electrode drawing sections connected to each of the multiple number of sense lines 21 as a multiple number of conductive wirings are arranged, and for each of the electrode drawing sections, a controller means (controller IC) is electrically connected to the electrode drawing sections via a flexible circuit substrate (FPC substrate).

In a touch sensor panel module according to the present invention, for each of unit drive sheets matching the unit sensor sheets on either of the both ends of the multiple number of drive lines 51 as a multiple number of conductive wirings formed on a substrate (glass plate) or drive sheet under the sensor sheet of the above-described sensor sheet module, electrode drawing sections connected to each of the multiple number of drive lines 51 as a multiple number of conductive wirings are arranged, and for each of the electrode drawing sections, a controller means (controller IC) is electrically connected to the electrode drawing sections via a flexible circuit substrate (FPC substrate).

Further, in Embodiment 1, when overlapping ends of the sense lines 21 with each other by overlapping each end of the multiple number of sense lines 21 on the sensor sheet 2, which are set to the downside, on each end of the multiple number of sense lines 21 on the sensor sheet 2, the sense lines 21 in a predetermined width on the lower side and the sense lines 21 in a predetermined width on the upper side are overlapped by taking a predetermined depth distance. Although a case in which the widths of the two sense lines 21 to be overlapped are the same is explained, not being limited to this, Embodiment 1 can also be applied to a case in which the widths of the two sense lines 21 to be overlapped are different from each other. This will be explained by using FIG. 6(a) and FIG. 6(b).

Figure 6:
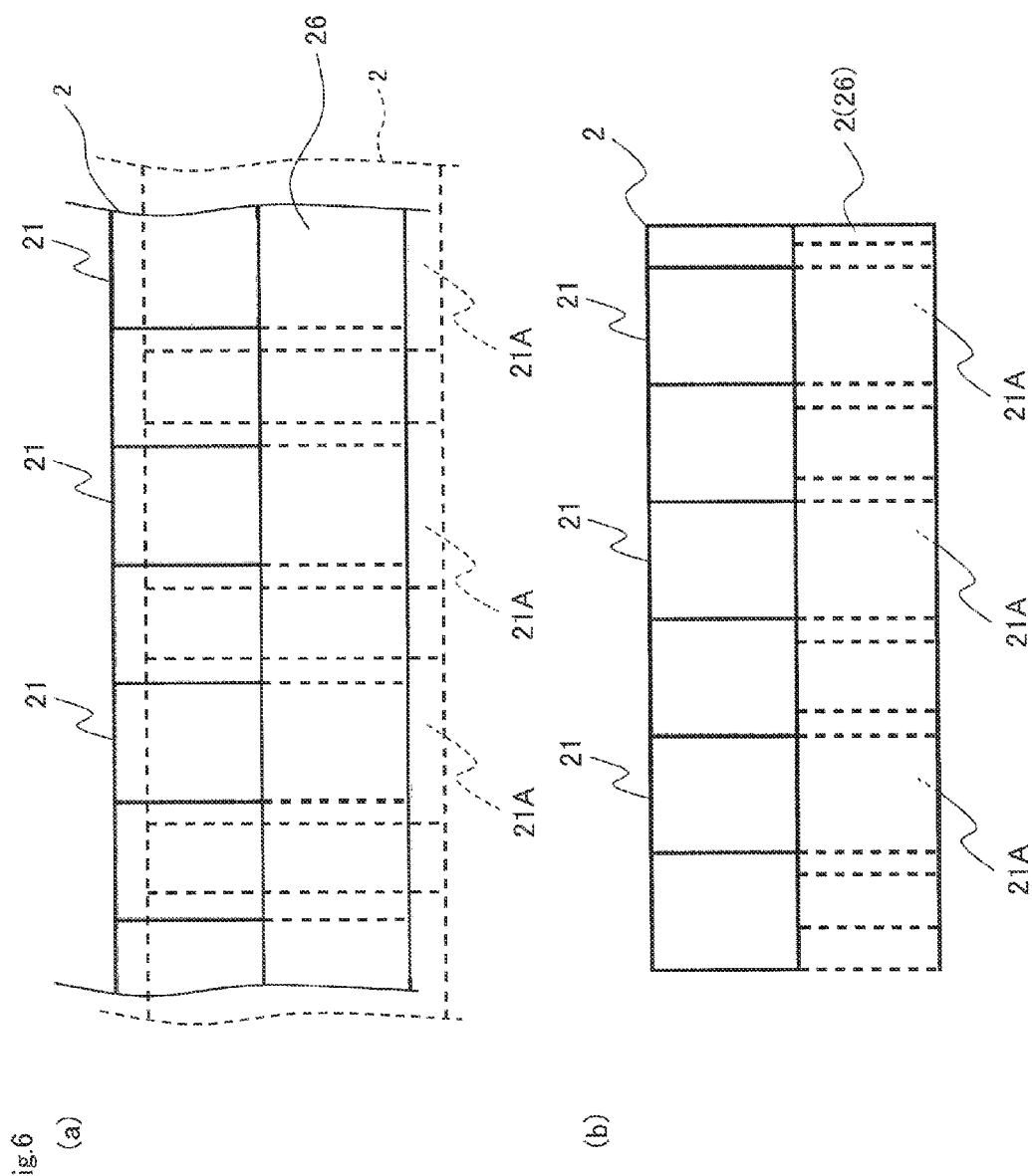
FIG. 6(a) is a plan view showing a state of ends of sense lines before adhering the two sensor sheets on the upper side and the lower side.
FIG. 6(b) is a plan view showing a state of ends of sense lines after adhering the two sensor sheets on the upper side and the lower side.

FIG. 6(a) is a plan view showing a state of ends of the sense lines 21 before adhering the two sensor sheets 2 on the upper side and the lower side, and FIG. 6(b) is a plan view showing a state of ends of the sense lines 21 after adhering the two sensor sheets 2 on the upper side and the lower side.

Firstly, as shown in FIG. 6(a), the anisotropic conductive film 26 that is horizontally long, is installed with a predetermined width on each end of the multiple number of sense lines 21 of the sensor sheet 2 so as to cover each end. The width of each end of the multiple number of sense lines 21 is a usual width, that is, several μm.

Next, as in the broken line portions shown in FIG. 6(a), on each end of the multiple number of sense lines 21 of the sensor sheet 2 on the lower side, each end of the multiple number of sense lines 21A of the sensor sheet 2 on the upper side are overlapped so as to match each other one-to-one, via the anisotropic conductive film 26. The width of each end of the multiple number of sense lines 21A is wider than the width of the multiple number of sense lines 21, and it has a width that is about 1.5 to 2.0 times wider than the width of the sense line 21. In a sheet of the sensor sheet 2, one end of each of the multiple number of sense lines 21 have a width in which a usual width (several μm) is not changed, and only the other end of each of the multiple number of sense lines 21 have a width that is wider than a usual width (several μm).

Thereafter, from the above of each end of the multiple number of sense lines 21 and 21A that are overlapped, a predetermined pressure and temperature are applied to the anisotropic conductive film 26 that is interposed therebetween such that ends of the multiple number of sense lines 21 and 21A are electrically connected so as to match each other one-to-one.

At this time, an overlapping distance is fixed, and in a direction orthogonal to the overlapping direction (the longitudinal direction of the sense lines 21 and 21A), image processing is performed by using an image signal from a camera, and thereby fine adjustments are performed such that ends of the sense lines 21 centrally positioned among each end of the multiple number of sense lines 21 and 21A are maximally overlapped to allow an overall efficient overlapping.

Thereby, in adhering each end of the multiple number of sense lines 21 and 21A with each other, adhering is further ensured and made easy by the sense lines 21A having a wider width among the sense lines 21 and 21A.

Further, in Embodiment 1, ends of the sense lines 21 have a usual width of several μm (2 μm to 20 μm; in this Embodiment, several μm), and ends of the sense lines 21 having a wider width are formed to be wider than the usual width of ends of the sense lines 21. However, not being limited to this, the end may be a cross-shape end 21B1 of a sense line 21B shown in FIG. 7 (a), or may be an inverted T-shape end 21C1 of a sense line 21C shown in FIG. 7(b). The widths of each end 21B1 and 21C1 of the multiple number of sense lines 21B and 21C are wider than the width of each of the multiple number of sense lines 21, and they are about 1.5 to 2.0 times wider than the width of the sense line 21. Also in this case, in adhering each end 21B1 of each of the multiple number of sense lines 21B with each other, adhering of the multiple number of sense lines 21B on the upper side and the lower side is further ensured and made easy since the cross-shape width of the sense line 21B is wide. Further, in adhering each end 21C1 of each of the multiple number of sense lines 21C with each other, adhering of the multiple number of sense lines 21C on the upper side and the lower side is further ensured and made easy since the T-shape width of the sense line 21C is wide.

At this time, an overlapping distance is fixed, and in a direction orthogonal to the overlapping direction (the longitudinal direction of the sense lines), image processing is performed by using an image signal from a camera, and thereby fine adjustments are performed such that ends of the sense lines 21B or 21C centrally positioned among each end 21B1 or 21C1 of the multiple number of sense lines 21B or 21C are maximally overlapped to allow an overall efficient overlapping. In the image processing in this case, fine adjustments can be performed by moving one of the sensor sheets 2 in the left-right direction and front-back direction (overlapping direction) such that the center point P of each end 21B1 or 21C1 of the multiple number of sense lines 21B or 21C match between ends above and below.

Figure 7:
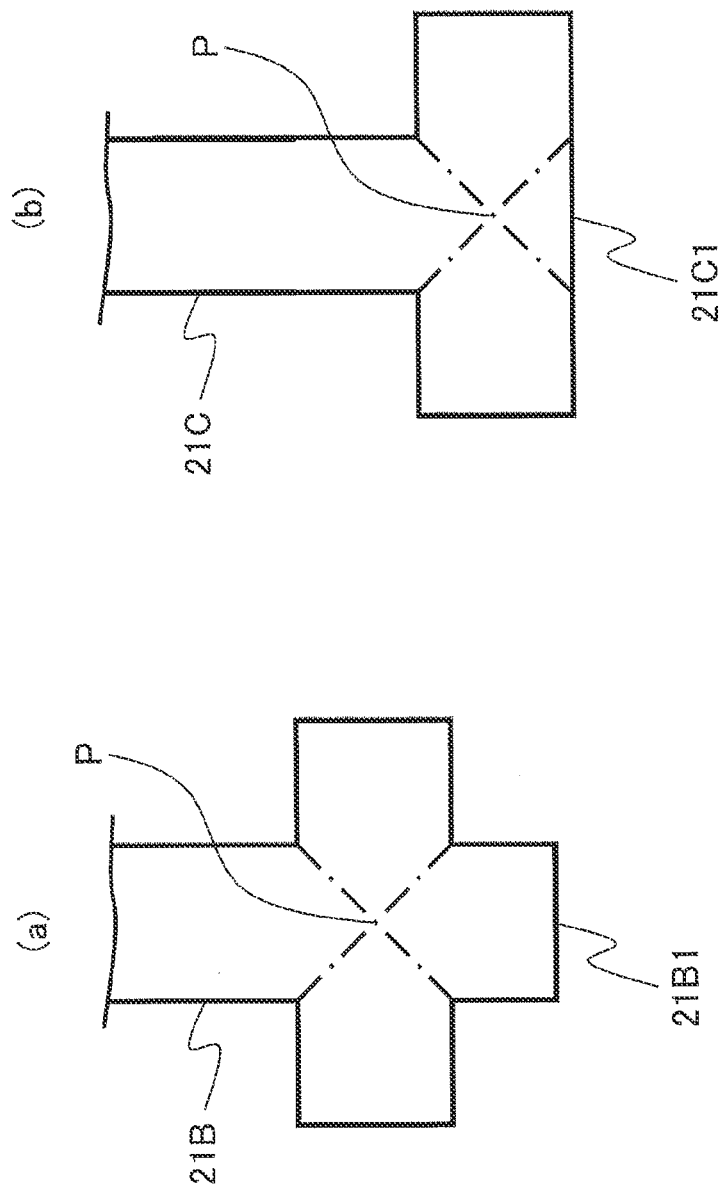
FIG. 7(a) is a plan view showing a cross-shape end of a sense line on a sensor sheet.
FIG. 7(b) is a plan view showing an inverted T-shape end of a sense line on a sensor sheet.
Figure 8:
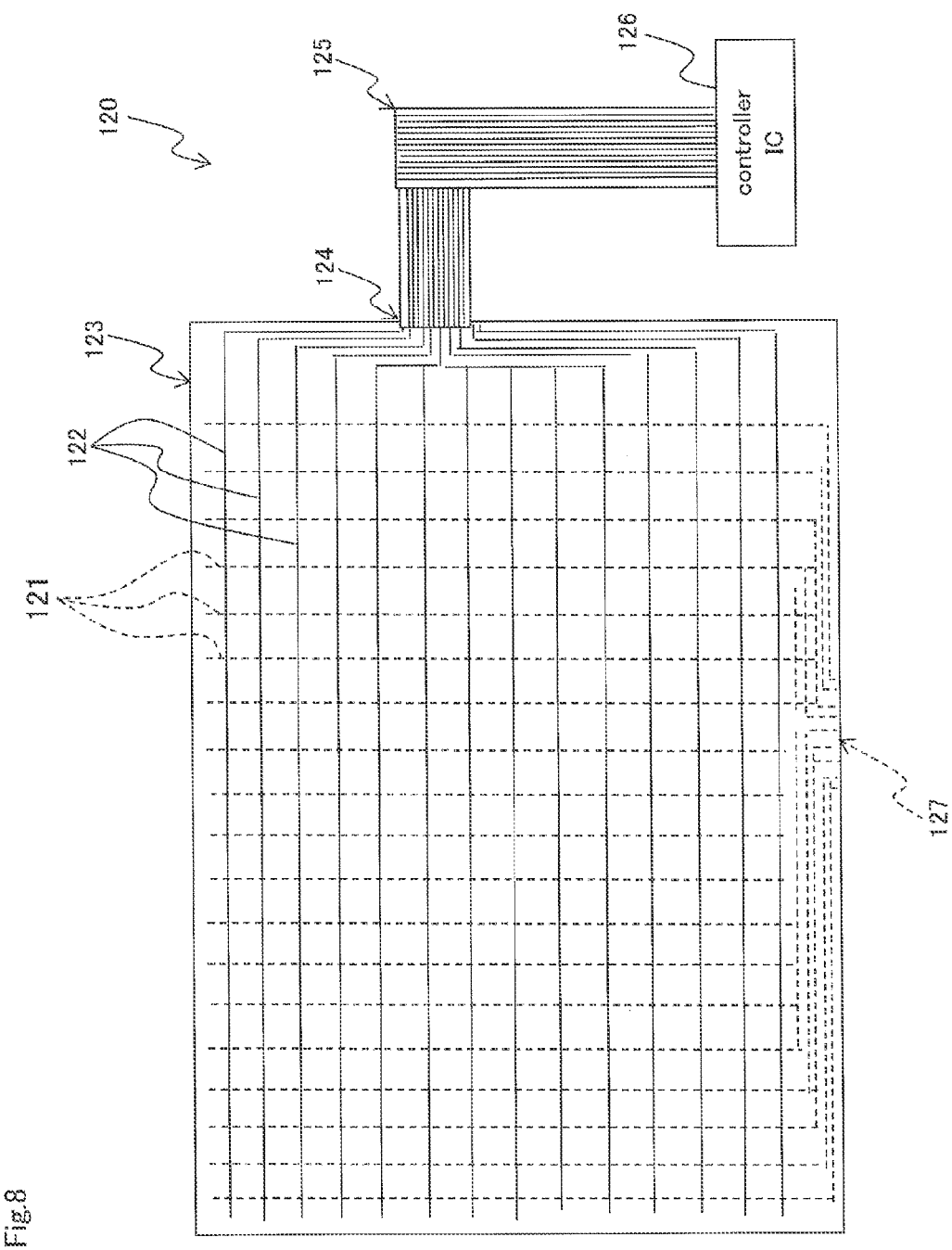
FIG. 8 is a plan view schematically showing a configuration example of a conventional sensor sheet module.

Further, by using the cross-shape end 21B1 of the sense line 21B shown in FIG. 7 (a), it is possible to perform accurate positioning including rotation as an alignment mark of the tip of the sense line 21B. Accordingly, the cross-shape portion of the sense line 21B may be provided in the center sense line among the multiple number of sense lines 21 on the sensor sheet 2, or the cross-shape portion of the sense line 21B may be provided for every 10 lines. The cross-shape portion of the sense line 21B may be provided together with the above-described alignment marks 6 and 7, or the cross-shape portion of the sense line 21B may be provided instead of the above-described alignment marks 6 and 7. The cross-shape portion of the sense line 21B may be provided together with the above-described alignment mark 6, such that the positioning may be performed in two stages.

Embodiment 2

The above-described Embodiment 1 is an embodiment for explaining a case in which ends of the sense lines 21 are overlapped with each other on each end of the multiple number of sense lines 21 on one of the sensor sheets 2, while each end of the multiple number of sense lines 21 on the other sensor sheet 2 being set to the downside. However, Embodiment 2 is an embodiment for explaining a case in which each end of the multiple number of sense lines 21 on one of the sensor sheets 2 and each end of the multiple number of sense lines 21 on the other sensor sheet 2 are positioned such that ends of the sense lines 21 match each other one-to-one (non-overlapping state), and in this state, an anisotropic conductive paste (ACP) is interposed therebetween, and a predetermined pressure for butting is applied on the two sensor sheets 2 at a predetermined temperature such that electrical connection are performed.

If ends of the sense lines 21 to be electrically connected are the inverted T-shape 21C1 of the sense line 21C shown in FIG. 7(b), a region of ends of the sense lines 21 to be butted would increase, and thus it is possible to electrically connect ends 21C1 of the sense lines 21 with each other more certainly and easily. Further, although not shown in FIG. 7(b), it is possible to: provide a cut off portion (concave portion) having two inclined sides of a triangle or trapezoid with an opened frontage at the central position of the end surface 21C1 of an inverted T-shape of one of the sense lines 21C; provide a triangle-shaped portion with a projected tip (a projection portion that fits into the concave portion) at the central position of the end surface 21C1 of an inverted T-shape of the other sense line 21C; and butt and insert the triangle-shaped portion with a projected tip at the central position of the end surface 21C1 of an inverted T-shape of one of the sense lines 21C against the cut off portion at the central position of the end 21C1 of an inverted T-shape of the other sense line 21C, to enable to perform positioning of each end of the two sense lines 21C more accurately and easily. For portions between ends of the two sense lines 21C that are butted, other than the portions between the cut off portion and the triangle-shaped portion, an anisotropic conductive paste (ACP) is interposed therebetween and a predetermined pressure for butting is applied on the two sensor sheets 2 at a predetermined temperature such that electrical connection of each end of the two sense lines 21C are performed.

In the above-described Embodiment 1, a difference in level is caused in the case where each end of the sense lines 21 are overlapped with each other, on each end of the multiple number of sense lines 21 on one of the sensor sheets 2, while each end of the multiple number of sense lines 21 on the other sensor sheet 2 being set to the downside, and thus an area for the region of the sensor sheet 2 that is required becomes larger as the overlapping is performed. However, according to Embodiment 2 as described above, a difference in level as in the above-described Embodiment 1 is not caused, and thus an area for the region of the sensor sheet 2 that is required becomes smaller as the overlapping is performed.

Embodiment 3

Embodiment 3 is an embodiment for explaining an electronic equipment in which the touch sensor panel module according to the above-described Embodiment 1 or 2 is used on a display screen as a position input device.

The electronic equipment of Embodiment 3 is composed of a computer system, and the electronic equipment has: the touch sensor panel module 1 of the above-described Embodiment 1; operation keys such as a keyboard and a mouse enabling various input commands; a display section such as a liquid crystal display device enabling display of various images such as an initial screen, a selection screen and a processing screen on a display screen in accordance with various input commands; a speaker; a microphone; a camera; a CPU (central processing unit) as a control section performing overall control; a RAM as a temporary storage means working as a work memory at the time of startup of the CPU; and a ROM as a computer readable recording medium (storage means) in which a control program for operating the CPU and various data used for the control program are recorded.

The touch sensor panel module 1 has a touch panel controller such as a controller IC for driving a plurality of drive lines of a touch panel, and estimating or detecting the capacity value after amplifying a capacity value of capacitance between the sense lines and the drive lines by an amplifier to detect a touch position on a screen.

The touch sensor panel module 1 is disposed on the display screen of the display section such that, by touching, for example, an icon region on the display screen, the icon region is linked with a display function and display is performed in accordance with a selection of the icon region on the display screen.

The ROM is composed of readable recording media (storage means) such as a hard disk, an optical disk, a magnetic disk and an IC memory. This control program and various data used for the same may be downloaded to the ROM from portable optical disk, magnetic disk, IC memory and the like, or may be downloaded to the ROM from a hard disk of a computer, or may be downloaded to the ROM via radio or wired internet or the like.

This electronic equipment can be, for example, a portable telephone device such as a portable telephone device with a camera, a portable terminal device and an information processing device. The portable terminal device can be a smart phone, a tablet and the like, and the information processing device can be a PC monitor, a signage, an electronic blackboard, an information display and the like.

As described above, the present invention is exemplified by the use of its preferred Embodiments 1-3 of the present invention. However, the present invention should not be interpreted solely based on the Embodiments 1-3. It is understood that the scope of the present invention should be interpreted solely based on the scope of the claims. It is also understood that those skilled in the art can implement equivalent scope of technology, based on the description of the present invention and common knowledge from the description of the detailed preferred Embodiments 1-3 of the present invention. Furthermore, it is understood that any patent, any patent application and any references cited in the present specification should be incorporated by reference in the present specification in the same manner as the contents that are specifically described therein.

INDUSTRIAL APPLICABILITY

The present invention is able to considerably enhance the efficiency of a product cycle by avoiding loss from designing to production including member loss matching various sizes of touch sensor panels, in the following fields: a capacitive touch sensor panel module for driving drive lines formed on a substrate or film under a sensor sheet in which a multiple number of sense lines in a transverse direction are drawn to an electrode drawing section, and estimating or detecting a capacity value of capacitance between the sense lines and the drive lines that are orthogonal to each other to detect a touch position on a screen; a sensor sheet and a sensor sheet module used for this touch sensor panel module; and electronic equipment such as a PC (personal computer) or a tablet terminal using this touch sensor panel module.

The invention claimed is:

1. A sensor sheet, wherein unit sensor sheets having a square outer shape on which a multiple number of conductive wirings are arranged in parallel are disposed in n rows or m columns, or n rows and m columns (n, m are natural numbers of 2 or higher), and wherein each end of each of the multiple number of conductive wirings are sequentially matched one-to-one between the unit sensor sheets and electrically connected, and wherein the respective multiple number of conductive wirings are connected in a longitudinal direction thereof and are integrated in the n rows or m columns, and m columns of the unit sensor sheets.

2. The sensor sheet of claim 1, wherein ends of the multiple number of conductive wirings between the unit sensor sheets are matched one-to-one, an anisotropic conductive paste or an anisotropic conductive film using nanoparticles is interposed between the ends, and the ends are electrically connected with each other by thermocompression bonding with a predetermined temperature and a predetermined pressure.

3. A sensor sheet module, wherein for each of the unit sensor sheets on either of the both ends of the multiple number of conductive wirings connected in a longitudinal direction, of the sensor sheet of claim 1, electrode drawing sections connected to each of the multiple number of conductive wirings are arranged, and for each of the electrode drawing sections, a controller means is electrically connected to the electrode drawing sections via a flexible circuit substrate.

4. A touch sensor panel module, wherein for each of unit drive sheets matching the unit sensor sheets, on either of the both ends of the multiple number of conductive wirings formed on a substrate or drive sheet under the sensor sheet of the sensor sheet module of claim 3, electrode drawing sections connected to each of the multiple number of conductive wirings are arranged, and for each of the electrode drawing sections, the controller means is electrically connected to the electrode drawing sections via a flexible circuit substrate.

5. An electronic equipment, wherein the touch sensor panel module of claim 4 is used on a display screen as a position input device.

6. A sensor sheet module, wherein for each of the unit sensor sheets on either of the both ends of the multiple number of conductive wirings connected in a longitudinal direction, of the sensor sheet of claim 2, electrode drawing sections connected to each of the multiple number of conductive wirings are arranged, and for each of the electrode drawing sections, a controller means is electrically connected to the electrode drawing sections via a flexible circuit substrate.

7. A touch sensor panel module, wherein for each of unit drive sheets matching the unit sensor sheets, on either of the both ends of the multiple number of conductive wirings formed on a substrate or drive sheet under the sensor sheet of the sensor sheet module of claim 6, electrode drawing sections connected to each of the multiple number of conductive wirings are arranged, and for each of the electrode drawing sections, the controller means is electrically connected to the electrode drawing sections via a flexible circuit substrate.

8. An electronic equipment, wherein the touch sensor panel module of claim 7 is used on a display screen as a position input device.

* * * * *